US008619034B2

(12) United States Patent
Grad

(10) Patent No.: US 8,619,034 B2
(45) Date of Patent: Dec. 31, 2013

(54) SENSOR-BASED DISPLAY OF VIRTUAL KEYBOARD IMAGE AND ASSOCIATED METHODOLOGY

(75) Inventor: Joel Grad, Trognee (BE)

(73) Assignee: Sony Europe (Belgium) NV, Londerzeel (BE)

( * ) Notice: Subject to any disclaimer, the term of this patent is extended or adjusted under 35 U.S.C. 154(b) by 1008 days.

(21) Appl. No.: 12/482,152

(22) Filed: Jun. 10, 2009

(65) Prior Publication Data

US 2009/0303200 A1    Dec. 10, 2009

(30) Foreign Application Priority Data

Jun. 10, 2008   (GB) .................................. 0810613.0

(51) Int. Cl.
*G06F 3/02* (2006.01)
*G06F 3/041* (2006.01)
*G06F 3/048* (2013.01)
*G06F 3/14* (2006.01)

(52) U.S. Cl.
USPC ........... 345/168; 345/169; 345/173; 715/773; 715/864

(58) Field of Classification Search
USPC ......... 345/156, 168–179, 619, 660–661, 666; 178/18.01, 18.03; 715/700, 764–765, 715/767, 771, 773, 781, 788–789, 798–801, 715/863–865

See application file for complete search history.

(56) References Cited

U.S. PATENT DOCUMENTS

| 5,812,117 A | 9/1998 | Moon |
| 6,005,533 A | 12/1999 | Wilson |
| 2004/0041723 A1* | 3/2004 | Shibamiya et al. ........... 341/176 |
| 2004/0135823 A1* | 7/2004 | Wingett et al. ............... 345/856 |
| 2006/0161871 A1 | 7/2006 | Hotelling et al. |
| 2006/0209040 A1* | 9/2006 | Garside et al. ................ 345/173 |

(Continued)

FOREIGN PATENT DOCUMENTS

| DE | 103 10 794 A1 | 9/2004 |
| EP | 1 887 454 A2 | 2/2008 |

(Continued)

OTHER PUBLICATIONS

European Office Action dated Dec. 6, 2010 in corresponding European Application No. 09 251 314.2.

(Continued)

*Primary Examiner* — Bipin Shalwala
*Assistant Examiner* — Keith Crawley
(74) *Attorney, Agent, or Firm* — Oblon, Spivak, McClelland, Maier & Neustadt, L.L.P.

(57) ABSTRACT

A display device includes a touch screen having a display surface that displays images. The touch screen outputs a signal indicating a position on the display surface that has been touched. The display device also includes a first sensor that senses a position of an object relative to the display surface. The display device further includes a controller that generates a virtual keyboard image including a plurality of virtual keys for display on the display surface. The controller generates a left side portion and a right side portion of the virtual keyboard image, and chooses, as a display portion, one of the left side portion and the right side portion of the virtual keyboard image corresponding to the position of the object relative to the display surface as sensed by the first sensor. The controller controls the touch screen to display the display portion on the display surface.

12 Claims, 7 Drawing Sheets

(56) References Cited

U.S. PATENT DOCUMENTS

2008/0284744 A1* 11/2008 Park et al. ..................... 345/173
2009/0251422 A1* 10/2009 Wu et al. ........................ 345/173
2012/0127069 A1* 5/2012 Santhiveeran et al. ........ 345/156

FOREIGN PATENT DOCUMENTS

| EP | 1 983 402 A1 | 10/2008 |
|---|---|---|
| JP | 2006-031499 A | 2/2006 |
| WO | WO 2005/101176 A2 | 10/2005 |
| WO | WO 2007/066488 A1 | 6/2007 |
| WO | WO 2008/085418 A2 | 7/2008 |
| WO | WO 2008/085791 A2 | 7/2008 |

OTHER PUBLICATIONS

Office Action dated Sep. 18, 2013, issued in Chinese Patent Application No. 200910145873.0, filed Jun. 10, 2009 (with English translation). Ax Ay.

* cited by examiner

SENSOR-BASED DISPLAY OF VIRTUAL KEYBOARD IMAGE AND ASSOCIATED METHODOLOGY

CROSS-REFERENCE TO RELATED APPLICATIONS

This application is based upon and claims the benefit of priority from British/European Application No. 0810613.0 filed 10 Jun. 2008, the entire contents of which are herein incorporated by reference.

BACKGROUND

1. Technical Field

Some examples of the present invention relate to a display device, in particular including a touch screen, and a method of displaying a virtual keyboard image on the display surface of the touch screen.

2. Description of the Related Art

Various devices are known using touch screens as graphical user interfaces. For instance, mobile telephone devices, personal organizer devices and such like are able to display virtual keys, including alpha-numeric keys and icons, on the display surface of the touch screen and respond to the display surface being touched by a user to carry out appropriate functions identified by the keys displayed on the display surface.

BRIEF SUMMARY

There is a problem of controlling many different functions using a relatively small display surface. A display device can be provided with a plurality of different display images between which a user can navigate, each display image having its own plurality of virtual keys.

Unfortunately, it is still desirable sometimes to provide a relatively large number of keys as part of the same image such that it still becomes difficult to provide all of those virtual keys on the display surface of the touch screen, particularly when those keys have to be of a sufficient size to be actuated by the touch of a user. A common example of an image having such a difficulty is an image of a virtual keyboard with alphabetic keys, such as a standard "QWERTY" keyboard.

Some embodiments of the present invention can reduce such problems.

One example relates to an information-processing apparatus including a display device. The display device includes a touch screen having a display surface configured to display a plurality of images. The touch screen is configured to output a signal indicating a position on the display surface that has been touched. The display device also includes a first sensor configured to sense a position of an object relative to the display surface; and a controller configured to generate a virtual keyboard image including a plurality of virtual keys for display on the display surface, to generate a left side portion of the virtual keyboard image and a right side portion of the virtual keyboard image, to choose, as a display portion, one of the left side portion of the virtual keyboard image and the right side portion of the virtual keyboard image corresponding to the position of the object relative to the display surface as sensed by the first sensor, and to control the touch screen to display the display portion on the display surface.

In another example, there is a method of displaying a virtual keyboard image on a display surface of a touch screen configured to output a signal indicating a position on the display surface that has been touched. The method includes sensing, with a sensor, a position of an object relative to the display surface; choosing, as a display portion, one of a left side portion of the virtual keyboard image and a right side portion of the virtual keyboard image corresponding to the position of the object sensed in the sensing, and displaying the display portion on the display surface of the touch screen. The choosing can be performed with a processor.

A further example relates to a computer-readable storage medium including a program for performing, when the program is run on a computer, a method of displaying a virtual keyboard image on a display surface of a touch screen configured to output a signal indicating a position on the display surface that has been touched. The method includes sensing a position of an object relative to the display surface; choosing, as a display portion, one of a left side portion of the virtual keyboard image and a right side portion of the virtual keyboard image corresponding to the position of the object sensed in the sensing; and displaying the display portion on the display surface of the touch screen.

An additional example concerns an information-processing apparatus, including a touch screen having a display surface configured to display a plurality of images. The touch screen is configured to output a signal indicating a position on the display surface that has been touched. The information-processing apparatus also includes means for sensing a position of an object relative to the display surface; and means for generating a virtual keyboard image including a plurality of virtual keys for display on the display surface, for generating a left side portion of the virtual keyboard image and a right side portion of the virtual keyboard image, for choosing, as a display portion, one of the left side portion of the virtual keyboard image and the right side portion of the virtual keyboard image corresponding to the position of the object relative to the display surface as sensed by the means for sensing, and for controlling the touch screen to display the display portion on the display surface.

In this way, even though the virtual keyboard image as a whole can contain a large number of virtual keys, those keys can be displayed clearly to a user and actuated easily by the user. In particular, only a portion of the virtual keyboard image containing some of the virtual keys need be displayed at any one time. Choice of which portion of the virtual keyboard image is displayed can be controlled automatically in accordance with the proximity sensor sensing proximity of a user to an appropriate part of the display surface.

It should be appreciated that, in some devices, in order to cause a virtual keyboard to be displayed, it is necessary to press a physical button or at least to move a cursor to a text entry box, which then automatically causes a virtual keyboard to be displayed. An additional advantage that can arise from a system or device conforming to the present invention is that the system or device can enhance a user's experience by omitting this step. In particular, the system or device can react to output signals of at least one proximity sensor so as to display the virtual keyboard without the user having explicitly to select it. This can make it quicker and easier for the user to enter text data.

The controller can generate the virtual keyboard image as a plurality of adjacent portions wherein at least one of each of said portions can be chosen as the display portion.

In other words, according to information from proximity sensors, the controller can select one of the adjacent portions for display.

Preferably, the controller can generate the virtual keyboard image as a left side portion and a right side portion.

This can be particularly convenient when dividing a keyboard image having a large number of keys in the horizontal direction.

The controller can choose, as the display portion, a portion of the virtual keyboard image having a position relative to the virtual keyboard image corresponding to a position of at least a part of the user relative to the display surface and sensed by the at least one proximity sensor.

Hence, if a user approaches a relative part of the display surface, for instance an upper part or a right side part, then the controller causes a portion of the total virtual keyboard image with the same relative positioning to that total virtual keyboard image, for instance an upper portion or a right side portion, to be displayed on the display surface. In this way, a user can be provided with an appropriate portion of the total virtual keyboard image according to how the display surface is approached.

Where the virtual keyboard image is to be divided into a left side portion and a right side portion, the controller can choose, as a display portion, the left side portion or the right side portion in response to the at least one proximity sensor sensing the at least a part of the user to the left side or the right side of the display surface.

This arrangement can be particularly useful where the display device is to be operated for example by the thumb of the user. In particular, when the user grips the display device with a right hand on the right side of the device so as to use the right thumb for operating displayed keys, then the right side portion of the virtual keyboard image is displayed. Similarly, when the user grips the left side of the device with a left hand, the left side portion of the virtual keyboard image is displayed for operation with the left thumb.

It would also be possible to reverse this arrangement such that when one side of the device is gripped, the opposite side portion of the virtual keyboard image is displayed for operation with the opposite hand.

In addition, the controller can choose, as the display portion, a combination of both the left side portion and the right side portion in response to the proximity sensors sensing at least a part of the user to the left side and to the right side of the display surface such that the entire virtual keyboard image is displayed on the display surface. Thus, for example, if a user grips the device with both hands so as to use both thumbs, then the entire virtual keyboard image can be displayed.

Preferably, the virtual keyboard image is an image including a standard alphabet key array, such as a QWERTY keyboard.

When the controller controls the touch screen to display the display portion, it can cause the touch screen to display virtual keys which will also be displayed with other portions of the virtual keyboard image. Hence, when using the display device to mimic a standard keyboard, such as a QWERTY keyboard, a first portion including half of the alphabetic keys can be displayed together with other standard keys such as shift, space and enter keys and, a second portion including the remaining alphabetic keys can be displayed together with the same standard keys.

Preferably the at least one proximity sensor is positioned at one lateral side of the display surface, in other words, the left or right side of the display surface, optionally towards the lower side as facing the user.

In a preferred embodiment, the at least one proximity sensor includes a second proximity sensor positioned at an opposite lateral side of the display surface.

In this way, it is possible to detect a user's hand at the left or right side of the device.

The display device can be provided as part of any other device, for instance a mobile telephone device, a personal organizer device or a portable gaming device. The display device can also be incorporated in tablet-style computing devices and e-book electronic reader devices.

Of course, some embodiments include a computer program having code components that, when loaded on a computer (or the computing parts of a display device) and executed, will cause that computer (or device) to operate in the manner defined above. A computer readable storage medium can have recorded thereon appropriate code components.

A more complete appreciation of the inventions and many of the attendant advantages thereof will be readily obtained as the same becomes better understood by reference to the following detailed description when considered in connection with the accompanying drawings. However, the accompanying drawings and their exemplary depictions do not in any way limit the scope of the inventions embraced by this specification.

DETAILED DESCRIPTION

Figure 1A:
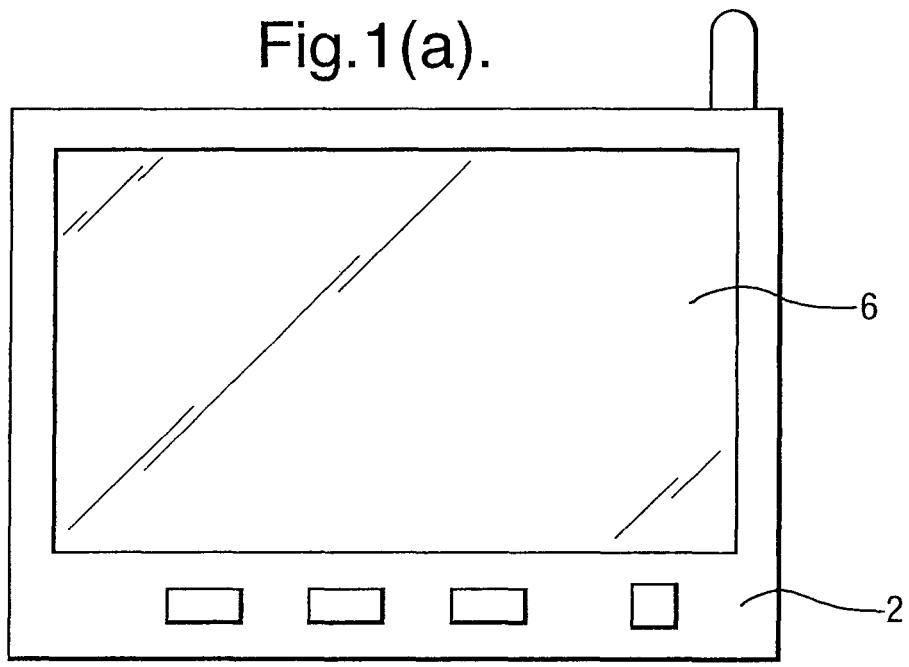
FIGS. 1(a), (b) and (c) illustrate schematically embodiments for application to a mobile telephone device, a personal organizer device and a portable gaming device.
Figure 1B:
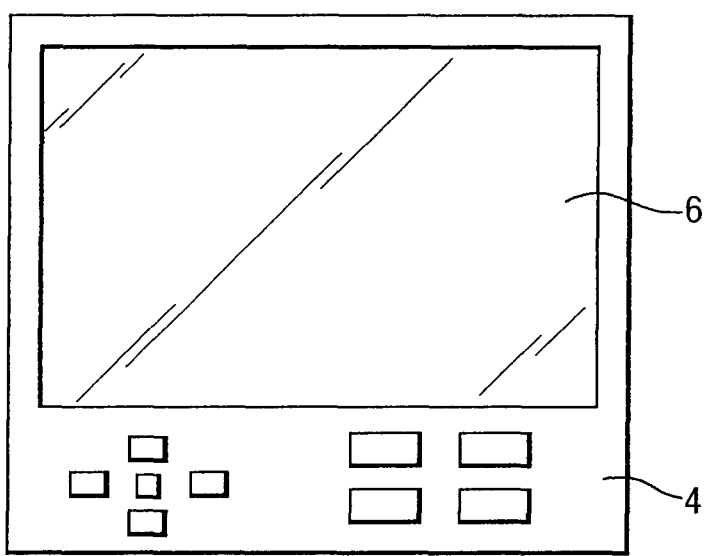
Figure 1C:
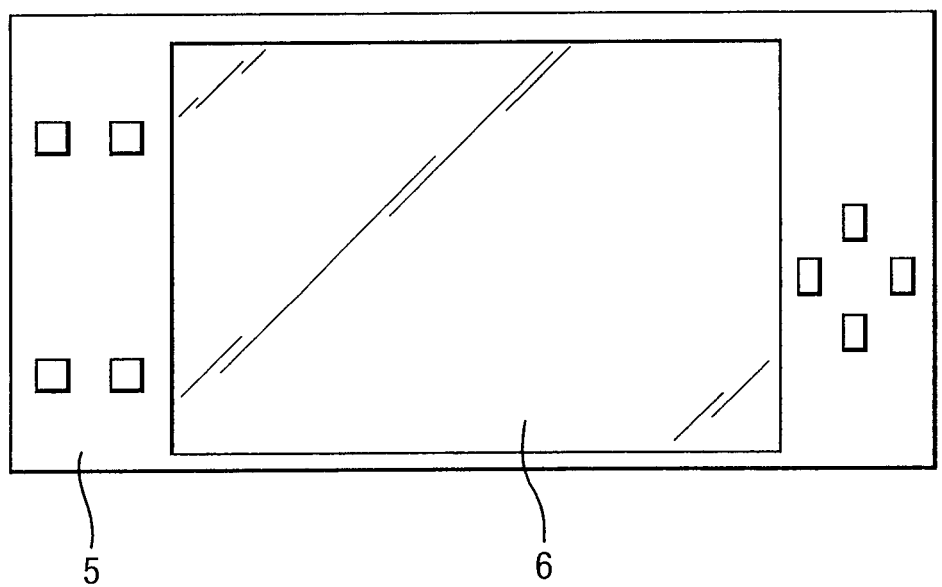

Embodiments can exist in a wide variety of devices using a touch screen as a graphical user interface. In this regard, FIGS. 1(a) to (c) illustrate schematically a mobile telephone device 2, a personal organizer device 4 and a portable gaming device 5 incorporating an exemplary display device 6. Those having skill in the art will recognize that other embodiments, both in portable and other devices, are possible.

As will be described in greater detail below, the display device 6 includes a touch screen on which a plurality of keys can be displayed. The touch screen is sensitive to touch by a user and, in response to such touch, outputs a signal such that touching the display surface of the touch screen at a position corresponding to a displayed key causes operation of a function corresponding to that displayed key.

Figure 2:
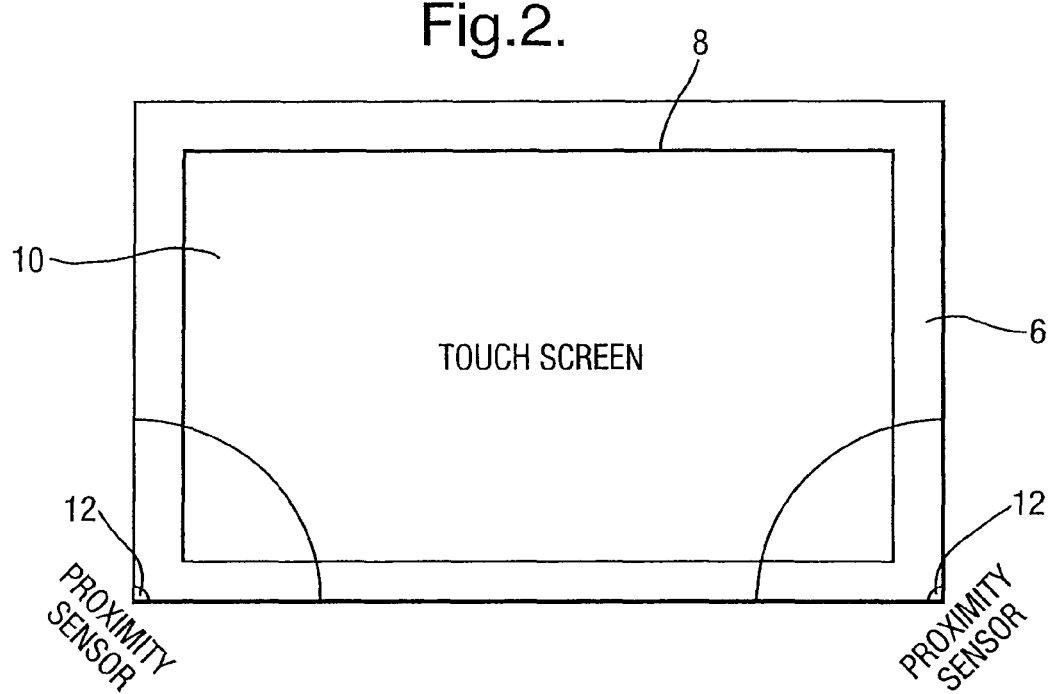
FIG. 2 illustrates schematically an exemplary display device.

The display device 6 illustrated in FIG. 2 includes a touch screen 8 with a display surface 10.

The display device 6 also includes at least one proximity sensor and, as illustrated, includes a first proximity sensor 12 to the left side of the display surface 10 and a second proximity sensor 12 to the right side of the display surface 10.

The proximity sensors 12 can take any suitable form, such as that of ultrasonic proximity sensors, capacitive proximity sensors, photoelectric proximity sensors etc.

The proximity sensors 12 can detect the proximity of part of a user, for instance a thumb, hand etc. to the display surface 10.

In some embodiments, it is sufficient merely to provide one proximity sensor. Such a proximity sensor can detect proximity of a part of a user to different portions of the display surface 10. Alternatively, additional proximity sensors can be provided around the display surface 10 so as to detect more specifically proximity of parts of a user to the display surface 10.

Figure 3:
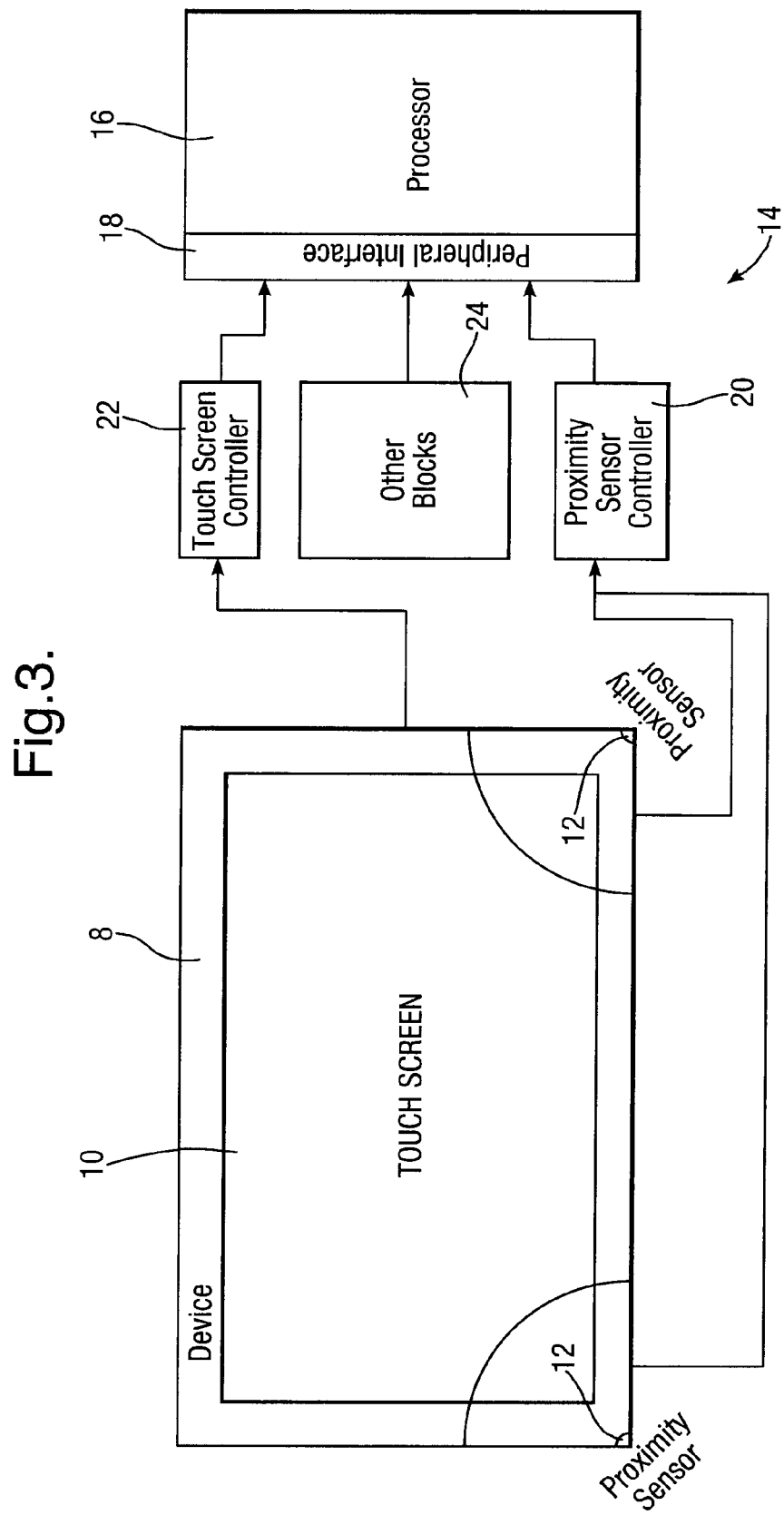
FIG. 3 illustrates schematically the touch screen and control components of the display device of FIG. 2.

FIG. 3 illustrates schematically the display device together with its various control features comprising its controller 14.

As illustrated, a main processor 16 is provided with a peripheral interface 18. By means of the peripheral interface 18, the main processor 16 communicates with a proximity sensor controller 20, a touch screen controller 22 and other functional blocks 24, such as a USB controller or interfaces for other input/output.

By means of the touch screen controller 22, the touch screen can be driven to display images on the display surface 10. Also, the position at which the touch screen is touched by a user can be communicated with a processor 16 so as to enable appropriate functions to be controlled.

The proximity sensor controller 20 can be used to activate one or more proximity sensors 12 and to communicate to the processor 16 the sensing of proximity of at least a part of the user relative to one or more of the proximity sensors 12 and, hence, the display surface 10.

Figure 4:
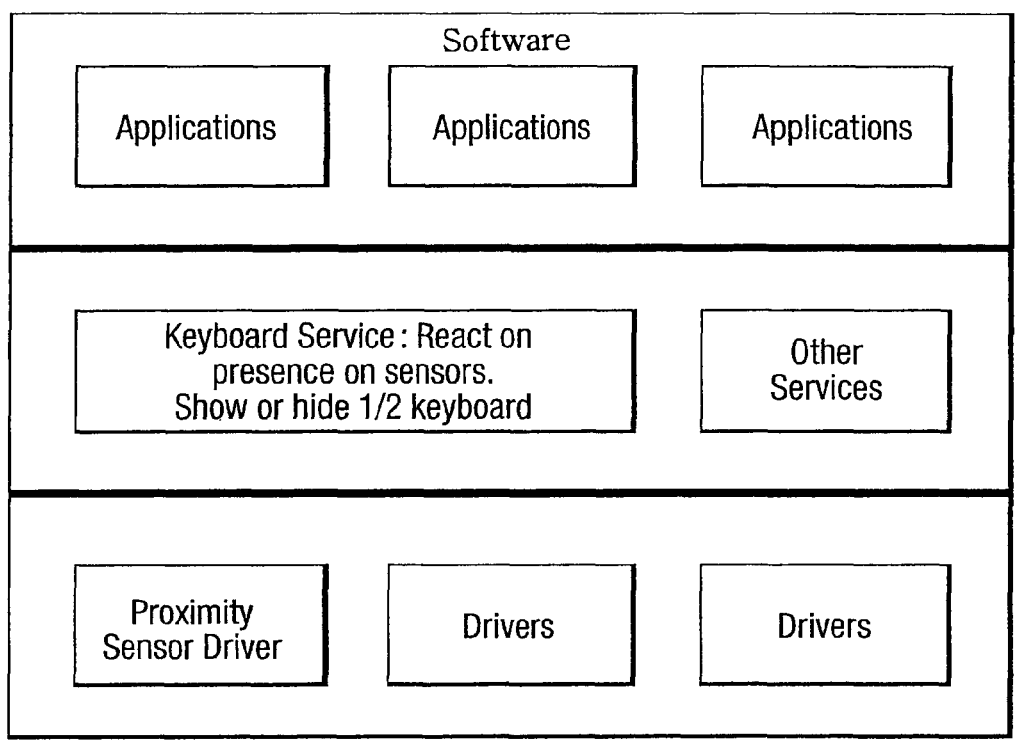
FIG. 4 illustrates schematically functions of the controller of FIG. 3.

High-level software blocks suitable for use in the processor 16 are illustrated schematically in FIG. 4. The appropriately configured controller 14, including processor 16, is arranged to generate a virtual keyboard image including a plurality of virtual keys which can be displayed on the display surface 10 of the touch screen 8.

In a preferred embodiment, the virtual keyboard image is an image of a standard alphabetic keyboard, for instance as known as a "QWERTY" keyboard.

The controller 14 can drive the touch screen to display only a portion of the total virtual keyboard on the display surface at any one time.

In one preferred embodiment, the controller 14 is configured to generate the virtual keyboard image as two portions, for instance a left side portion including an image of the left side of the virtual keyboard and a right side portion including an image of the right side of the virtual keyboard.

Figure 5:
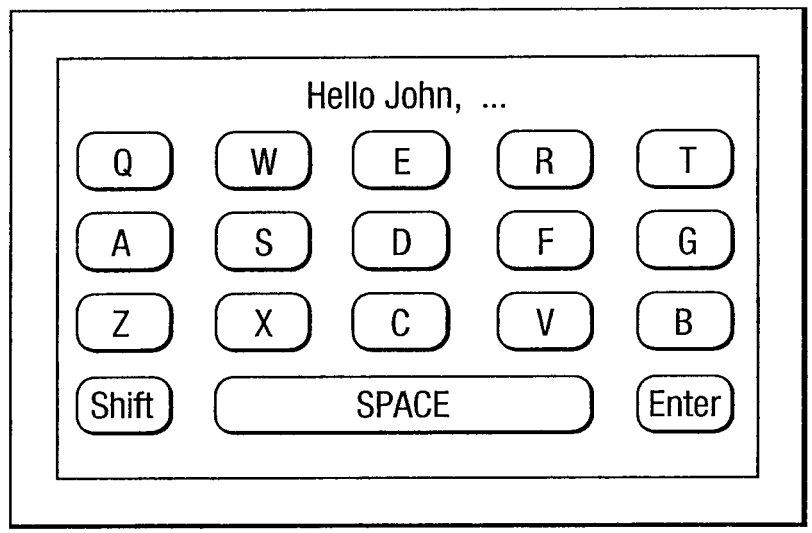
FIGS. 5 and 6 illustrate examples of left and right side portions for display.
Figure 6:
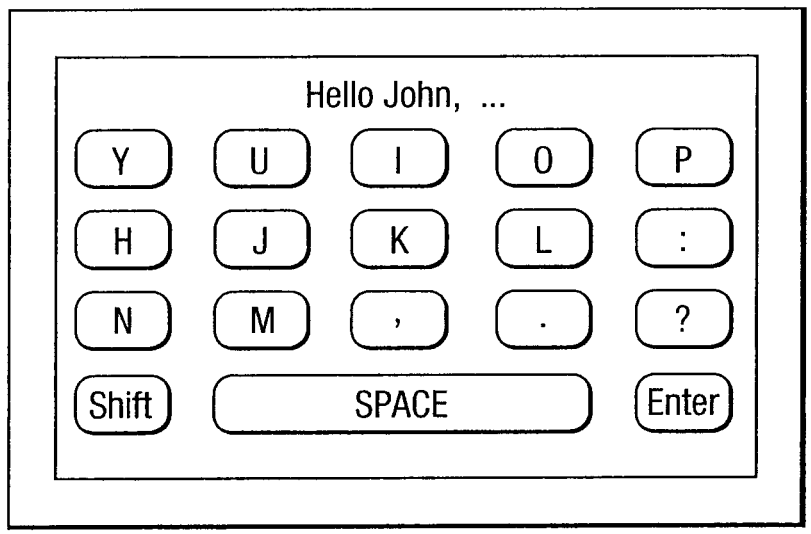

Responsive to a signal from the left side proximity sensor 12, the controller 14 can cause the touch screen 8 to display only the left side portion as illustrated in FIG. 5. Similarly, responsive to a signal from the right side proximity sensor 12, the controller 14 can cause the touch screen to display the right side portion on a display surface as illustrated in FIG. 6. In the illustrated embodiment, common keys, such as shift, space and enter keys, can be displayed with both portions.

In this way, when a user of the display device brings a left hand up to the touch screen 8, the display device 6 displays only the left side of the virtual keyboard whereas when a user brings a right hand up to the touch screen 8, the display device 6 displays only the right side of the virtual keyboard on the display surface 10.

By displaying only half of the virtual keyboard at any one time, the individual keys of the virtual keyboard can be displayed with larger dimensions, thereby allowing larger or more usable keys to be displayed on a smaller display surface.

Figure 7:
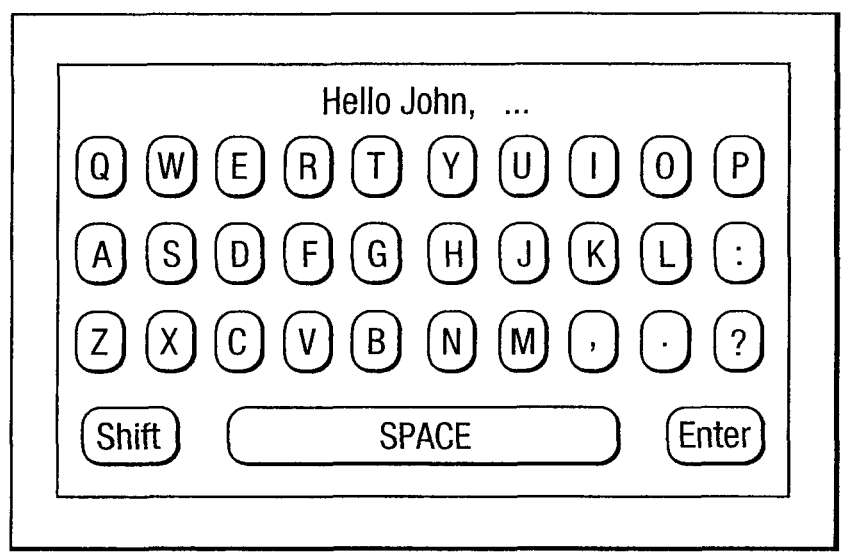
FIG. 7 illustrates a combination of portions comprising a keyboard image for display.

In a preferred embodiment, where both the left and right side proximity sensors sense the presence of a user, the controller 14 can cause the touch screen to display both the left portion and the right portion simultaneously on the display surface 10 as illustrated in FIG. 7. Although the displayed keys are smaller than those same keys as displayed in either the display of FIG. 5 or of FIG. 6, an individual user may choose to operate the display device in this way.

In the embodiment as described above, the controller 14 can divide the virtual keyboard into a left side and a right side and the data for this division may be predetermined and installed in memory.

Alternative divisions can be made, for example top and bottom portions.

Similarly, the image can be divided into more than 2 portions, for example providing left, middle and right portions. Where a middle portion is provided, sensing by left and right proximity sensors 12 of a presence of a user can cause the middle portion to be displayed, rather than the entire keyboard as described with reference to FIG. 7. Alternatively, additional proximity sensors can be provided in order to control display of additional portions.

The controller can determine interactively what portion of the keyboard image to display on the touch screen. For example, starting from a display illustrated in FIG. 5, when a right side proximity sensor 12 detects the presence of a user, the controller can cause the display to scroll across the virtual keyboard image interactively, rather than merely switch to the right-hand portion as illustrated in FIG. 6.

The controller can also operate interactively according to the extent to which the user's hand or thumb covers a proximity sensor. In this respect, each proximity sensor 12 can generate a signal representing how much of its surface area is obscured by a user, for instance the user's thumb.

Figure 8A:
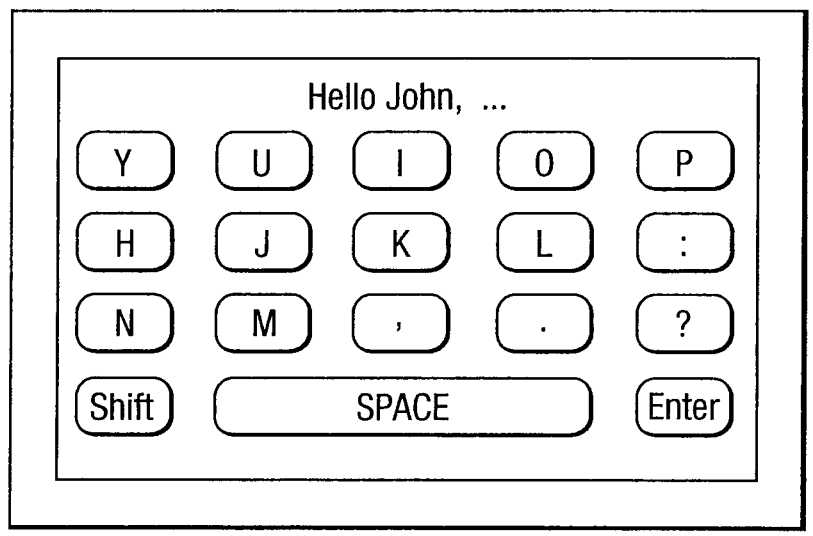
FIGS. 8(a) and (b) illustrate how display of an image can be varied.
Figure 8B:
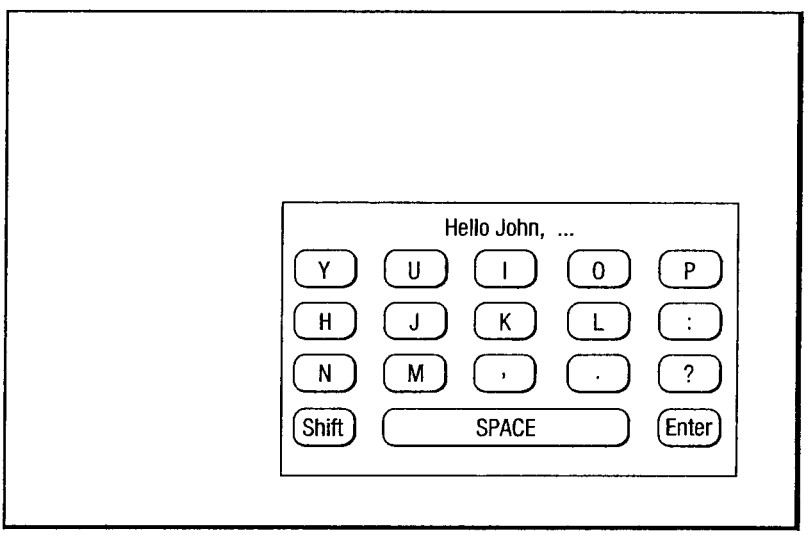

FIG. 8(a) illustrates an example where the user's thumb is detected hovering above the top left detection area of the bottom right proximity sensor 12 as illustrated in FIG. 2. In this example, the controller can cause display of the full right portion in the manner described previously with reference to FIG. 6. However, if the user's thumb is detected only in the bottom right-hand sensing region of the bottom right-hand proximity sensor 12, the controller can cause display of a smaller virtual keyboard portion positioned closer to the extremities of the screen, in particular close to the user's thumb. This is illustrated in FIG. 8(b).

Of course, the controller can also operate with the left-side proximity sensor to produce a reduced image on the left side.

The description of standard features, such as local volatile and/or non-volatile memory, I/O capabilities, common peripheral devices, as well as hardware component functionality have been omitted for brevity, the detailed operation/description of which is well known to those skilled in the art.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, define, in part, the scope of the foregoing claim terminology such that no inventive subject matter is dedicated to the public.

The invention claimed is:

1. An information-processing apparatus, comprising:
   a display device including
      a touch screen having a display surface configured to display a plurality of images, the touch screen being configured to output a signal indicating a position on the display surface that has been touched;
      a first proximity sensor configured to sense a position of an object relative to the display surface; and a controller configured to generate a virtual keyboard image including a plurality of virtual keys for display on the display surface, to generate a left side portion of the virtual keyboard image and a right side portion of the virtual keyboard image, to choose, responsive to the sensed proximity of the object, as a display portion, one of the left side portion of the virtual keyboard image and the right side portion of the virtual keyboard image in response to the first proximity sensor sensing the object to the left side or the right side of the display surface corresponding to the position of the object relative to the display surface, to control the touch screen to display, of the virtual keyboard image, only the display portion on the display surface, and to cause an operation of a function corresponding to a key of the display portion, in response to a contact of the display surface of the touch screen at a position corresponding to the key, when only the display portion is displayed of the virtual keyboard image.

2. The information-processing apparatus according to claim 1, wherein the controller is configured to choose, as the display portion, a combination of both the left side portion of the virtual keyboard image and the right side portion of the virtual keyboard image in response to the first sensor sensing the object to the left side of the display surface and to the right side of the display surface to display the virtual keyboard image on the display surface.

3. The information-processing apparatus according to claim 1, wherein the virtual keyboard is an image including a standard alphabet key array.

4. The information-processing apparatus according to claim 1, wherein the first sensor is positioned at one lateral side of the display surface.

5. The information-processing apparatus according to claim 4, further comprising:
a second sensor positioned at an opposite lateral side of the display surface, relative to the one lateral side of the display surface.

6. The information-processing apparatus according to claim 1, wherein the information-processing apparatus is a telephone device.

7. The information-processing apparatus according to claim 1, wherein the information-processing apparatus is a personal organizer.

8. The information-processing apparatus according to claim 1, wherein the information-processing apparatus is a portable gaming device.

9. A method of displaying a virtual keyboard image on a display surface of a touch screen configured to output a signal indicating a position on the display surface that has been touched, the method including:
sensing, with a proximity sensor, a position of an object relative to the display surface;
choosing, responsive to the sensed proximity of the object as a display portion, one of a left side portion of the virtual keyboard image and a right side portion of the virtual keyboard image in response to the first proximity sensor sensing the object to the left side or the right side of the display surface corresponding to the position of the object sensed in the sensing, the choosing being performed with a processor;
displaying, of the virtual keyboard image, only the display portion on the display surface of the touch screen; and
causing an operation of a function corresponding to a key of the display portion, in response to a contact of the display surface of the touch screen at a position corresponding to the key, when only the display portion is displayed of the virtual keyboard image.

10. A computer readable medium including a program for performing, when the program is run on a computer, a method of displaying a virtual keyboard image on a display surface of a touch screen configured to output a signal indicating a position on the display surface that has been touched, the method including:
sensing a position of an object relative to the display surface;
choosing, responsive to the sensed proximity of the object, as a display portion, one of a left side portion of the virtual keyboard image and a right side portion of the virtual keyboard image in response to the first proximity sensor sensing the object to the left side or the right side of the display surface corresponding to the position of the object sensed in the sensing;
displaying, of the virtual keyboard image, only the display portion on the display surface of the touch screen; and
causing an operation of a function corresponding to a key of the display portion, in response to a contact of the display surface of the touch screen at a position corresponding to the key, when only the display portion is displayed of the virtual keyboard image.

11. An information-processing apparatus, comprising:
a touch screen having a display surface configured to display a plurality of images, the touch screen being configured to output a signal indicating a position on the display surface that has been touched;
means for sensing a position of an object relative to the display surface; and
means for generating a virtual keyboard image including a plurality of virtual keys for display on the display surface, for generating a left side portion of the virtual keyboard image and a right side portion of the virtual keyboard image, for choosing, responsive to the sensed proximity of the object, as a display portion, one of the left side portion of the virtual keyboard image and the right side portion of the virtual keyboard image in response to the first proximity sensor sensing the object to the left side or the right side of the display surface corresponding to the position of the object relative to the display surface, for controlling the touch screen to display, of the virtual keyboard image, only the display portion on the display surface, and for causing an operation of a function corresponding to a key of the display portion, in response to a contact of the display surface of the touch screen at a position corresponding to the key, when only the display portion is displayed of the virtual keyboard image.

12. The information-processing apparatus according to claim 1, wherein the first sensor is at least one of an ultrasonic proximity sensor, a capacitive proximity sensor, and a photo-electric proximity sensor.

* * * * *